United States Patent
Melendez et al.

[11] Patent Number: 5,810,407
[45] Date of Patent: Sep. 22, 1998

[54] SHOVEL WITH RIGID, PERFORATED BLADE

[75] Inventors: James R. Melendez, Monticello; Jacob Lloyd Neet, Moab, both of Utah

[73] Assignee: Jacob Lloyd Neet dba Shrake Brand Tools, Moab, Utah

[21] Appl. No.: 786,792

[22] Filed: Jan. 21, 1997

Related U.S. Application Data

[63] Continuation-in-part of Ser. No. 515,392, Aug. 15, 1995, abandoned.

[51] Int. Cl.⁶ .................................................. A01B 1/04
[52] U.S. Cl. ............................................. 294/49; 209/219
[58] Field of Search ................. 294/49, 51, 55; 56/400.01; 172/371; 209/417–419

[56] References Cited

U.S. PATENT DOCUMENTS

| | | | |
|---|---|---|---|
| 420,106 | 1/1890 | Rowland | 294/55 X |
| 420,608 | 2/1890 | Rowland | 294/55 X |
| 902,954 | 11/1908 | Felty | 209/419 |
| 919,850 | 4/1909 | Goulet | 209/419 |
| 1,087,849 | 2/1914 | Thibault | 209/419 |
| 1,234,835 | 7/1917 | Watkins | 209/419 X |
| 1,427,523 | 8/1922 | Doyle | 209/419 |
| 1,493,766 | 5/1924 | Reimer | 294/49 |
| 2,432,643 | 12/1947 | Wotring | 294/49 X |
| 4,491,357 | 1/1985 | Richards | 294/49 |
| 5,383,696 | 1/1995 | Speier | 294/49 |

FOREIGN PATENT DOCUMENTS

| | | | |
|---|---|---|---|
| 20684 | 7/1898 | United Kingdom | 294/49 |

*Primary Examiner*—Johnny D. Cherry
*Attorney, Agent, or Firm*—Cahill, Sutton & Thomas P.L.C.

[57] ABSTRACT

A shovel includes a handle and a blade in which a central portion of the blade contains a plurality of perforations. The perforations are in an array of rows and columns and the rows extend in a direction perpendicular to the handle. The perforations are elongated and have a length in a direction approximately perpendicular to the handle. The perforations in adjoining columns and rows are interleaved a predetermined amount and the total area of the perforations is about one-half the area of the central portion. The blade is made from a single sheet of steel that is punched and bent into a compound shape to provide a rigid basket for retaining material. The perforated area is relatively flat, extends to the front edge of the blade, and can be reinforced with ridges that are formed when the sheet is bent. The front edge is reinforced by rolling the edge out of the plane of the central portion.

2 Claims, 3 Drawing Sheets

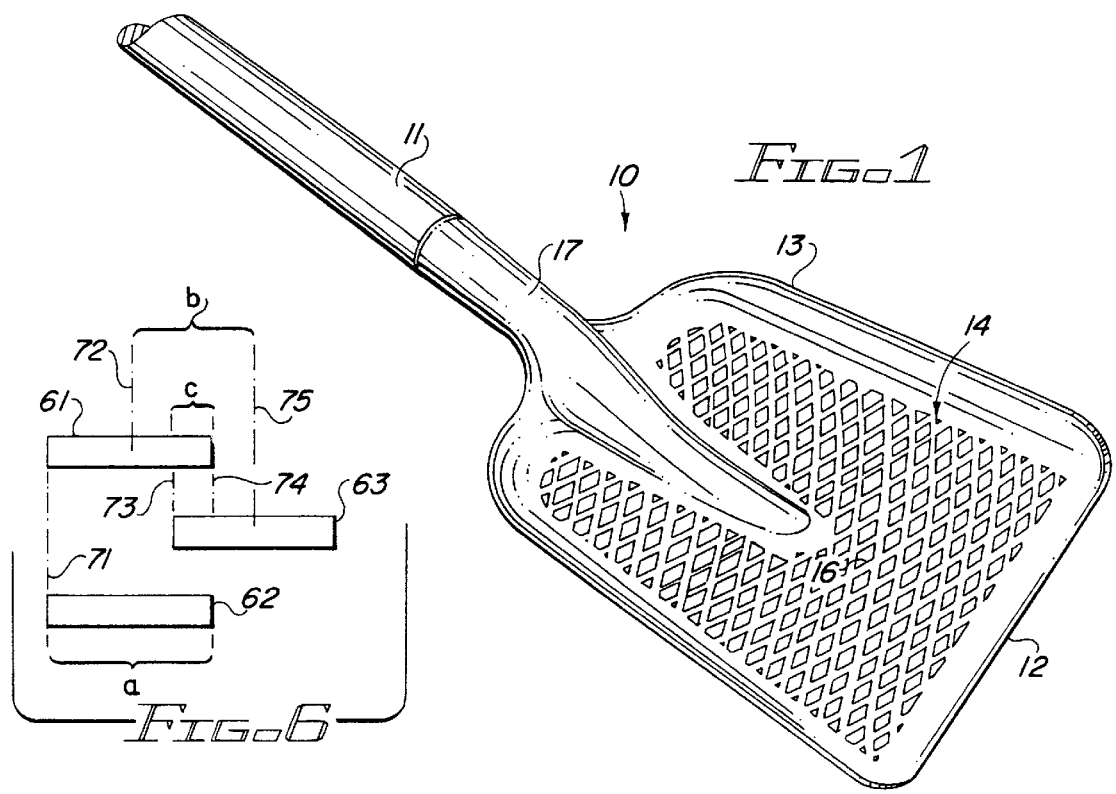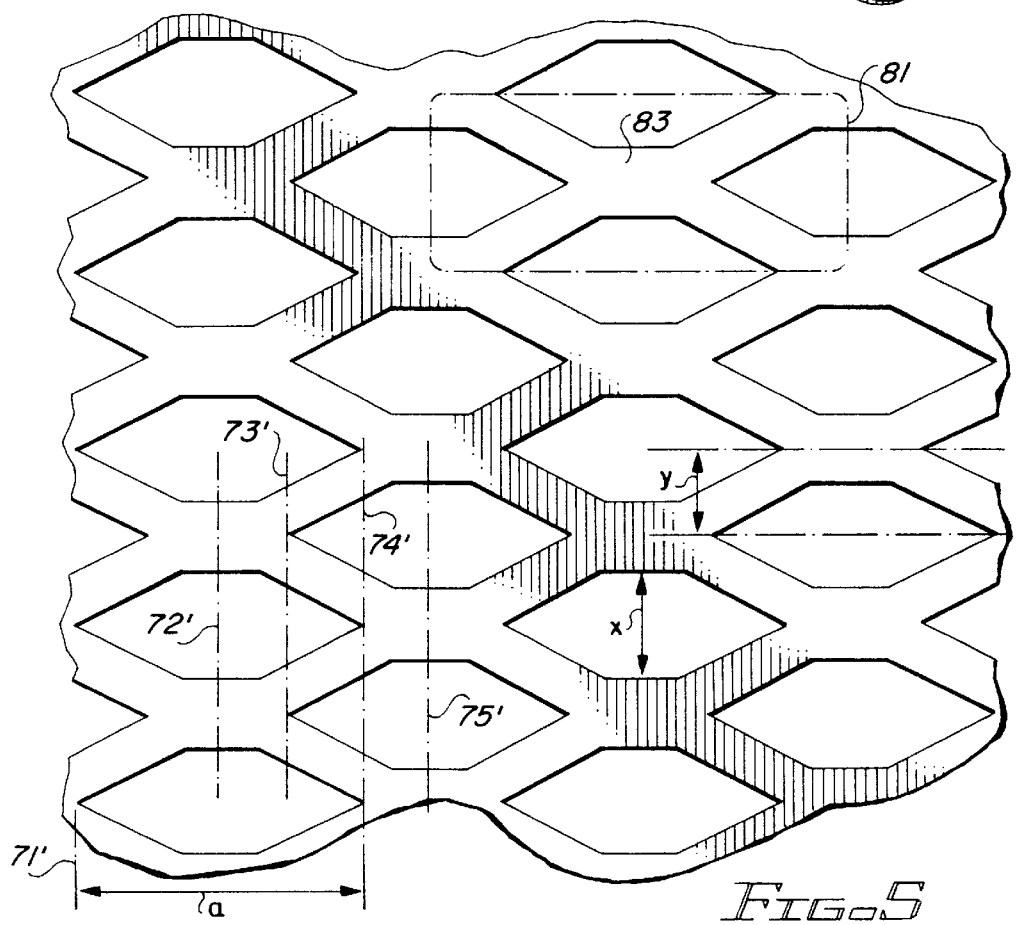

SHOVEL WITH RIGID, PERFORATED BLADE

CROSS-REFERENCE TO RELATED APPLICATION

This application is a continuation-in-part of application Ser. No. 515,392, filed Aug. 15, 1995, and now abandoned.

BACKGROUND OF THE INVENTION

This invention relates to a shovel and, in particular, to a shovel in which a central portion of the blade is perforated for sifting soil to separate finer soil from rocks, debris, or agglomerates.

Shovels having a central screen or sieve are known in the art. For example, U.S. Pat. No. 420,106 (Rowland) describes a shovel in which the blade includes a perimeter frame to which a plurality of wires are attached. The wires are woven in a diamond pattern in which the wires diagonally traverse the blade. U.S. Pat. No. 5,306,061 (Ives) discloses a shovel in which the blade includes a plurality of parallel ribs and a screen located over the ribs. U.S. Pat. No. 2,432,643 (Wotring) discloses a litter fork blade made from a sheet of metal having a plurality of rectangular holes. The blade is slightly curved along an axis orthogonal to the handle and is specifically designed for sifting turkey manure from sand or litter.

Such shovels of the prior art are not particularly rugged. The wires or screens used in the prior art to provide a sieve are subject to corrosion and separation from the perimeter of the blade. Further, the sieve can be distorted when a normal amount of force is applied to the shovel, allowing larger diameter material through the sieve. It is desired to provide a shovel with a sieve that is rugged and can keep its shape.

With shovels of the prior art, one can dig down into the soil with a blade to retrieve a mass of soil and then sift the soil through the blade. In this technique, the soil passes from the inner side of the blade to the outer side of the blade. It is desired to be able to loosen or work the surface of soil by pressing the back or outer side of the blade against the soil and moving the blade across the soil, scraping the top layer of soil to produce a loosened layer of fine particles. In this technique, soil passes from the outer side of the blade to the inner side of the blade. Shovels of the prior art cannot sift soil from the back of the blade to the front of the blade.

Shovels of the prior art are relatively expensive to manufacture. Typically, wire or screening is attached to a perimeter frame formed by cutting a large hole in the central portion of the blade. Even if the perimeter frame is relatively stiff, the fastening points between the frame and the sieve are the weak links in the construction and are also expensive to make. For example, U.S. Pat. No. 5,383,696 (Speier) discloses a shovel including a blade made from flattened expanded metal reinforced along three edges by separate metal pieces. It is not disclosed how the metal pieces are attached and the metal piece along the top of the blade is curved along an axis parallel to the handle. The curve renders the blade unsuited for sifting from the back of the blade to the front because of the small area in contact with the ground. The front or leading edge of the blade is cut, leaving serrations, and at least the serrated edge must be hardened. Heat treating after forming is expensive and does not overcome the general weakness of the design.

In view of the foregoing, it is therefore an object of the invention to provide a shovel that can sift soil in either direction through the blade of the shovel.

Another object of the invention is to provide a shovel in which the blade is perforated in a predetermined pattern to facilitate sifting soil.

A further object of the invention is to provide a shovel in which the blade includes a large, flat area for sifting soil from back to front through the blade.

Another object of the invention is to provide a shovel in which the blade includes a large, flat area that extends to the front edge of the shovel.

A further object of the invention is to provide a shovel having a single piece, perforated blade that is relatively inexpensive to manufacture.

Another object of the invention is to provide a shovel having a perforated blade that is substantially as strong as a solid blade.

A further object of the invention is to provide a shovel with a single piece blade having a central portion containing perforations in which the total area of the perforations is no more than approximately one-half the area of the central portion.

Another object of the invention is to provide a blade for a shovel in which a sieve in the blade does not deform in normal use.

A further object of the invention is to provide a shovel with a single piece blade having a central area containing perforations in which the perforations are arranged in rows and columns and the perforations of one column are interleaved with the perforations of an adjoining column and overlap the perforations of the adjoining column by no more than thirty percent.

Another object of the invention is to provide a shovel with a single piece blade having a central area containing perforations in which the perforations are elongated in a direction perpendicular to the handle of the shovel.

SUMMARY OF THE INVENTION

The foregoing objects are achieved by this invention in which a shovel includes a handle and a blade in which a central portion of the blade contains a plurality of perforations. The perforations are in an array of rows and columns and the rows extend in a direction perpendicular to the handle. In accordance with one aspect of the invention, the perforations are elongated and have a length in a direction approximately perpendicular to the handle. In accordance with another aspect of the invention, the perforations in adjoining columns and rows are interleaved a predetermined amount and the total area of the perforations is about one-half the area of the central portion. The size, orientation, and degree of overlap of the perforations combine to produce a shovel that is easily made, rugged, and screens soil well. The blade is made from a single sheet of steel that is punched and bent into a compound shape to provide a rigid basket for retaining material. The perforated area is relatively flat, extends to the front edge of the blade, and can be reinforced with ridges that are formed when the sheet is bent.

BRIEF DESCRIPTION OF THE DRAWINGS

A more complete understanding of the invention can be obtained by considering the following detailed description in conjunction with the accompanying drawings, in which:

FIG. 1 illustrates a shovel constructed in accordance with a first embodiment of the invention;

FIG. 5 illustrates the geometry of the perforations in the central area of the blade of a shovel constructed in accordance with a preferred embodiment of the invention;

FIG. 6 illustrates a detail of the geometry of the perforations;

DETAILED DESCRIPTION OF THE INVENTION

Figure 4:
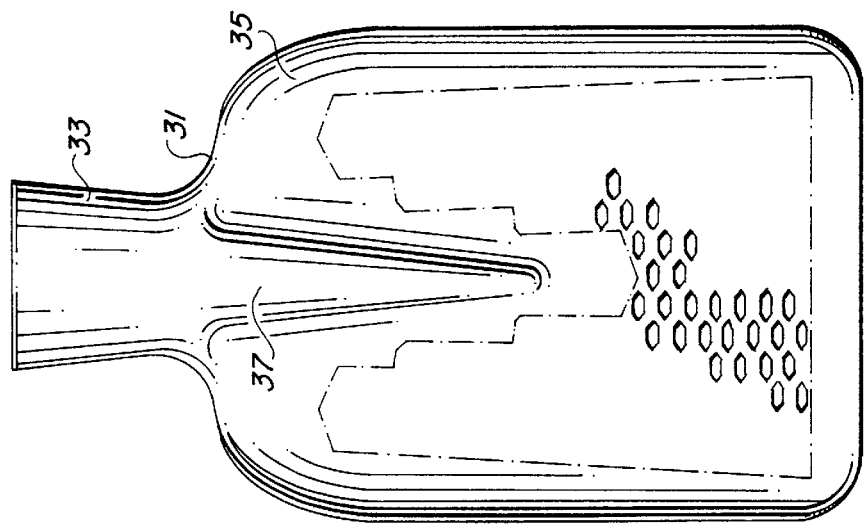
FIG. 4 is a plan view of a sheet that has been cut to shape for the heel of a blade and a socket for a handle has been partially formed in the heel.

In FIG. 1, shovel 10 includes handle 11 and blade 12. Blade 12 is preferably made from sixteen gauge sheet steel conforming to ASTM standard A-607. Other materials could be used instead. The preferred steel provides an acceptable compromise between workability and durability. Blade 12 includes perimeter 13 and integral sieve 14 formed by a plurality of perforations, such as perforation 16. Perimeter 13 curves upward, out of the plane of sieve 14 and a portion of the sheet is rolled to form socket 17 for receiving handle 11.

Figure 3:
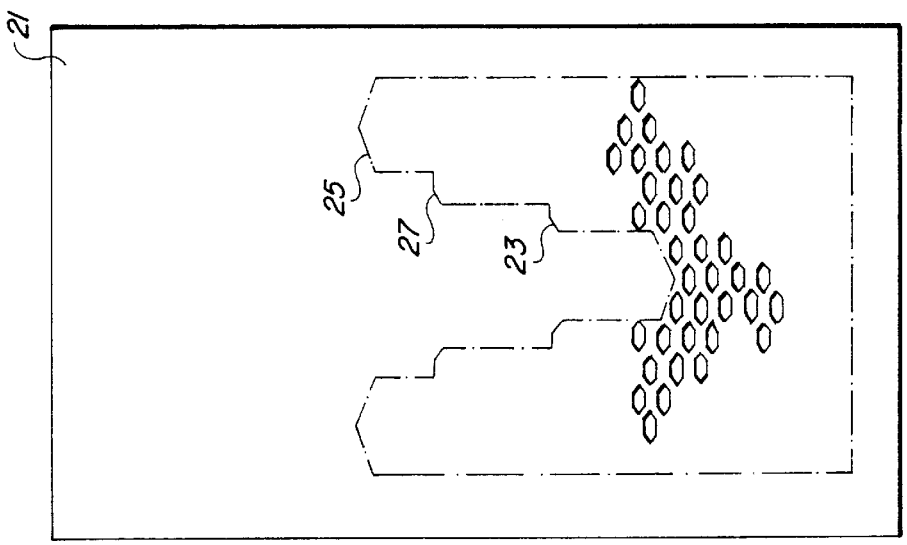
FIG. 3 is a plan view of a steel sheet in which all the columns of perforations are punched.
Figure 2:
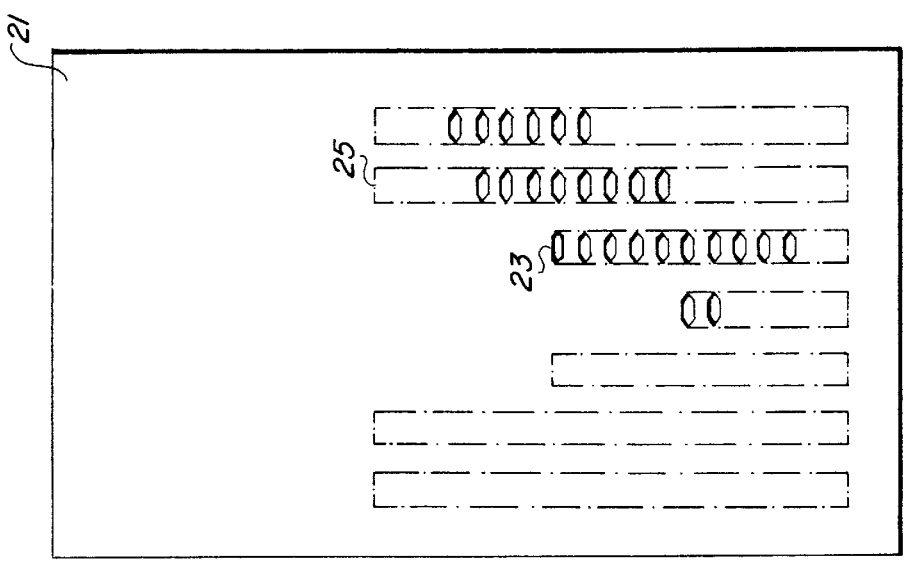
FIG. 2 is a plan view of a steel sheet in which alternate columns of perforations are punched.

FIGS. 2, 3, and 4 illustrate a preferred technique for making blade 12. In FIG. 2, sheet 21 has a plurality of columns of perforations punched therein, such as columns 23 and 25. The columns are separated by a predetermined distance. In FIG. 3, sheet 21 has additional columns of perforations punched therein, between the previously punched columns. For example, column 27 is inserted between columns 23 and 25. Because adjacent columns of perforations are interleaved, as described in more detail below, it is preferred to punch alternate columns simultaneously to avoid deformation of sheet 21 and to simplify tooling.

In FIG. 4, sheet 21 has corner portions cut away, forming heel 31, and is partially bent to begin the formation of socket 33 and perimeter 35. Socket 33 extends into the central area of the blade along ridge 37. Ridge 37 and the curved perimeter of the blade contribute to the overall stiffness of the blade.

FIG. 1 illustrates blade 12 in its final form with deepened perimeter 13 and sieve 14 including a plurality of perforations in interleaved rows and columns. FIG. 5 is an enlarged view of a portion of sieve 14. Each perforation is preferably in the form of an elongated hexagon having length $\alpha$. Elongated shapes other than a hexagon can be used, including closed curves.

Length $\alpha$ is preferably in a plane perpendicular to handle 11. In a comparison of a shovel having perforations elongated parallel to the handle with a shovel having perforations elongated perpendicular to the handle, the shovel with the perforations elongated perpendicular to the handle seemed to sift better and this embodiment is preferred.

The perforations are preferably arranged in interleaved rows and columns. FIG. 6 is a simplified illustration of the perforations, showing how the columns are interleaved. Apertures 61 and 62 are in a first column and aperture 63 is in a second, adjacent column. Aperture 62 has length $\alpha$ and the columns have center to center spacing b. In a preferred embodiment of the invention, the ratio $\alpha$:b is approximately 4:3. Stated another way, the columns illustrated in FIG. 6 overlap approximately twenty-five percent, as indicated at c. It is preferred that the columns overlap by no more than one third of the length of the perforations ($c \leq 0.33 \cdot \alpha$). Reference lines 71–75 in FIG. 6 correspond to reference lines 71'–75' in FIG. 5.

In accordance with the invention, adjacent rows are interleaved, that is, width x of a perforation is greater than center to center spacing y of the rows. In a preferred embodiment of the invention, the ratio x:y is approximately 9:8. The ratio of length $\alpha$ to width x is the aspect ratio of the perforations and indicates the amount of elongation. In a preferred embodiment of the invention, $\alpha$:x is approximately equal to 7:4.

The geometries described above concerning interleaving the rows and columns relate to a fundamental objective that the material removed to make sieve 14 (FIG. 1) be approximately equal to the area of the metal remaining in sieve 14. If the rows and columns were not interleaved, the area of the perforations would be substantially less than the area of the remaining metal in the central portion of the blade and the shovel would not sift as well. On the other hand, if the rows and columns are interleaved more deeply, the area of the perforations would be substantially greater than the area of the remaining metal and the sieve would be weakened.

Because the perforations form a tessellation or repeating pattern covering a surface, the amount of material removed can be approximated by considering the smallest repeating element of the pattern and ignoring the extra metal at the border of the perforated portion of the blade. Rectangle 81 in FIG. 5 outlines the smallest repeating area of the pattern. Stippled area 83 represents the remaining metal and is equal to the area of rectangle 81 minus the total area of the portions of the perforations within rectangle 81. Area 83 is approximately equal to the sum of the areas of the portions of perforations within rectangle 81 or approximately equal to one half of the area of rectangle 81.

In one embodiment of the invention, the pattern illustrated in FIG. 5 had the following dimensions, in inches.

$\alpha$=0.876
b=0.650
c=0.226
x=0.330
y=0.275

With the dimensions given above, rectangle 81 had an area of 0.715 square inches and X-shaped metal area 83 had an area of 0.347 square inches. These particular dimensions are by way of example only and should not be construed as the only suitable dimensions.

Figure 7:
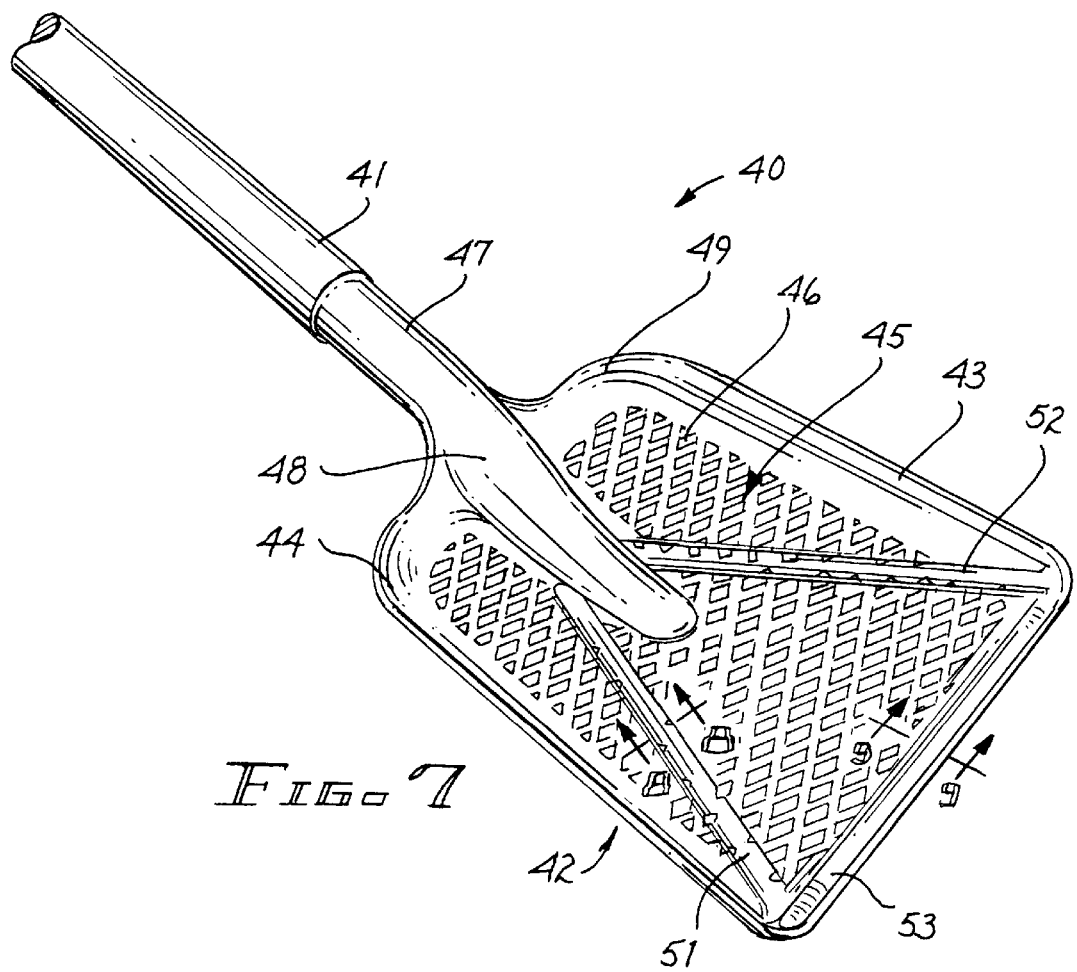
FIG. 7 illustrates a shovel constructed in accordance with a preferred embodiment of the invention.

FIG. 7 illustrates a blade constructed in accordance with a preferred embodiment of the invention. Shovel 40 includes handle 41 and blade 42. Blade 42 includes sides 43 and 44 and sieve 45 includes a plurality of perforations, such as perforation 46. Sides 43 and 44 curve upward, out of the plane of sieve 44, around axes that are approximately parallel with handle 41. A portion of the sheet is rolled to form socket 47 for receiving handle 41. Frog 48 is the transition between cylindrical socket 47 and planar sieve 45. Back 49 curves upward, out of the plane of sieve 44, around an axis that is approximately orthogonal with handle 41. Back 49 extends from socket 47 to sides 43 and 44, merging with the sides at curved corners to form a low retaining wall for holding material. Back 49 stiffens sides 43 and 44, and vice-versa. The curvature of the back, sides, corners, and frog stiffen sieve 45.

Figure 8:
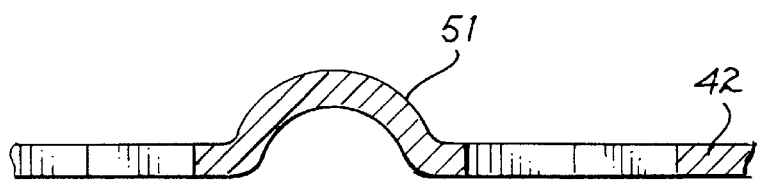
FIG. 8 is a cross-section along line 8—8 in FIG. 7.

Blade 42 includes diagonal ridges 51 and 52 and rolled edge 53. These features further stiffen the blade and improve the function of the blade. Ridge 51 is shown in cross-section in FIG. 8 and, in one embodiment of the invention, had an outside diameter of about ⅜". Ridges 51 and 52 also gather material toward frog 48 as blade 40 is pushed into the material, thereby better organizing the material and enabling the blade to hold more material than if the material were pushed straight back from edge 53. Ridges 51 and 52 preferably extend from near the middle of frog 48 to the corners of blade 42, at the bottom of the curve in each side.

Figure 9:
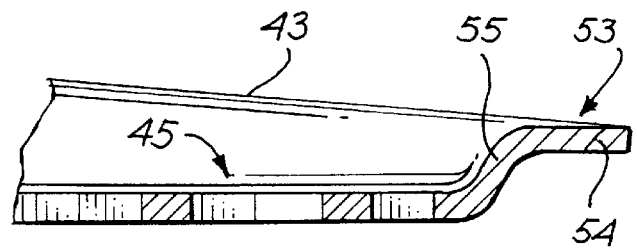
FIG. 9 is a cross-section along line 9—9 in FIG. 7.

Edge 53 is shown in cross-section in FIG. 9 and includes shoulder 54 coupled to sieve 45 by curved section 55, which elevates the shoulder slightly above the plane of the sieve. Sieve 45 extends to edge 53 and the rolled edge provides stiffening for the sieve. Thus, edge 53 is straight and maintains the planarity of sieve 45. The slight rise to shoulder 54 also helps to retain material when the blade is placed flat on the ground for sifting from the back of the blade to the front.

The invention thus provides a shovel having a perforated blade that is sturdy and can be applied to soil with the same vigor as a shovel having a solid blade. The blade is a single piece and has no joints to corrode or break, as in shovels of the prior art. Soil is shifted by passing in either direction through the blade and the blade has a large, relatively flat area to facilitate shifting. The curve sides and back of the blade provide a large carrying capacity.

Having thus described the invention, it will be apparent to those of skill in the art that various modifications can be made within the scope of the invention. For example, as noted above, the particular shape of the perforation is a matter of choice, although the perforations should be elongated in a direction perpendicular to the handle and should have a total area about one half of the area of the central portion of the blade. A shovel constructed in accordance with the invention can be used for sifting any material, such as sand or grain, not just soil. Ridges 51 and 52 can include perforations or a blank area can be provided for the ridges in the sheet, as is provided for the frog.

What is claimed as the invention is:

1. A shovel for sifting soil to separate finer soil from rocks, debris or agglomerates, said shovel comprising:
   (a) a handle;
   (b) a blade attached to said handle wherein said blade is made from a single piece of sheet metal and includes a generally planar central portion having a plurality of perforations, a first side, a second side, a front edge extending from said first side to said second side and forming junctions with said sides, and a back curving away from said central portion;
   (c) said perforations are formed in an array of rows and columns, the rows extending in a direction perpendicular to said handle and wherein the perforations in adjoining columns are interleaved;
   (d) a cylindrical socket for receiving said handle;
   (e) a frog forming a transition between the cylindrical socket and the planar central portion;
   (f) a pair of diagonal ridges formed integrally with said central portion; and
   (g) said ridges extending from said frog to the junction of said first side and front edge and the junction of said second side and said front edge, respectively, to strengthen the central portion and to gather soil on said planar central portion toward said frog.

2. The combination set forth in claim 1 wherein said central portion extends to a front edge of said blade and said front edge is curved out of the plane of said central portion to form a shoulder along the front edge.

\* \* \* \* \*